US012791510B2

(12) United States Patent
Choi et al.

(10) Patent No.: US 12,791,510 B2
(45) Date of Patent: Nov. 10, 2026

(54) CHEMIRESISTIVE SENSOR MODULE AND WIRELESS ELECTRONIC DEVICE AND IoT SYSTEM

(71) Applicants: IUCF-HYU (Industry-University Cooperation Foundation Hanyang University), Seoul (KR); UNIST (ULSAN NATIONAL INSTITUTE OF SCIENCE AND TECHNOLOGY), Ulsan (KR); KOREA ADVANCED INSTITUTE OF SCIENCE AND TECHNOLOGY, Daejeon (KR)

(72) Inventors: Seon-Jin Choi, Seoul (KR); Hoi Ri Moon, Ulsan (KR); Jihan Kim, Daejeon (KR); Joon-Seok Lee, Seoul (KR); Minhyuk Kim, Ulsan (KR); Seoyeon Seong, Ulsan (KR); Mingyu Jeon, Daejeon (KR); Honghui Kim, Daejeon (KR)

(73) Assignees: IUCF-HYU (INDUSTRY-UNIVERSITY COOPERATION FOUNDATION HANYANG UNIVERSITY), Seoul (KR); UNIST (ULSAN NATIONAL INSTITUTE OF SCIENCE AND TECHNOLOGY), Ulsan (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 686 days.

(21) Appl. No.: 18/137,537

(22) Filed: Apr. 21, 2023

(65) Prior Publication Data

US 2023/0341344 A1 Oct. 26, 2023

(30) Foreign Application Priority Data

Apr. 21, 2022 (KR) ........................ 10-2022-0049675
Apr. 11, 2023 (KR) ........................ 10-2023-0047669

(51) Int. Cl.
*G01N 27/12* (2006.01)

(52) U.S. Cl.
CPC .................................. *G01N 27/126* (2013.01)

(58) Field of Classification Search
CPC ............. G01N 27/126; G01N 33/0031; G01N 33/004; G01N 33/0044
See application file for complete search history.

(56) References Cited

U.S. PATENT DOCUMENTS

| | | | | |
|---|---|---|---|---|
| 8,480,955 B2 | 7/2013 | Yaghi et al. | | |
| 10,830,722 B2 | 11/2020 | Yassine et al. | | |
| 2015/0020577 A1* | 1/2015 | Luebke | ................ | G01N 27/041 73/31.06 |

OTHER PUBLICATIONS

Zhang et al, Turn-on and Ratiometric Luminescent Sensing of Hydrogen Sulfide Based on Metal-Organic Frameworks, Applied Materials & Interfaces, 2016, 8, 32259-32265; hereinafter "Zhang") (Year: 2016).*

(Continued)

*Primary Examiner* — Matthew D Krcha
*Assistant Examiner* — Austin Q Le
(74) *Attorney, Agent, or Firm* — CANTOR COLBURN LLP

(57) ABSTRACT

Provided are a chemiresistive sensor module, a wireless electronic device, and an IoT system. The chemiresistive sensor module includes a chemiresistive sensor including a composite material of a three-dimensional metal-organic framework and a two-dimensional metal-organic framework, a measuring unit for measuring a data on change in electrical resistance detected from the chemiresistive sensor (Continued)

120 and electrically connected to the chemiresistive sensor, and a communication unit for transmitting the data on change in electrical resistance to an external device.

16 Claims, 7 Drawing Sheets

(56) References Cited

OTHER PUBLICATIONS

Campbell et al, Chemiresistive Sensor Arrays from Conductive 2D Metal-Organic Frameworks, 2015, Journal of the American Chemical Society, 137, 13780-13783 (Year: 2015).*
Hong et al, MOF-on-MOF Architectures: Applications in Separation, Catalysis, and Sensing, 2021, Bulletin of the Korean Chemical Society, 42, 956-969 (Year: 2021).*
Won-Tae Koo et al., "Metal-Organic Frameworks for Chemiresistive Sensors", 1938 Chem 5, 1938-1963, Aug. 8, 2019 ª 2019 Elsevier Inc.
Xiangjian Guo et al., "2D/3D Copper-Based Metal-Organic Frameworks for Electrochemical Detection of Hydrogen Peroxide", Frontiers In Chemistry, Original Researchpublished: Oct. 7, 2021, doi: 10.3389/fchem.2021.743637.

* cited by examiner

CHEMIRESISTIVE SENSOR MODULE AND WIRELESS ELECTRONIC DEVICE AND IoT SYSTEM

CROSS-REFERENCE TO RELATED APPLICATION

This application claims priorities to and the benefit of Korean Patent Application No. 10-2022-0049675 filed in the Korean Intellectual Property Office on Apr. 21, 2022, and Korean Patent Application No. 10-2023-0047669 filed in the Korean Intellectual Property Office on Apr. 11, 2023, the entire contents of which are incorporated herein by reference.

BACKGROUND OF THE INVENTION

(a) Field of the Invention

A chemiresistive sensor module, a wireless electronic device and an IoT system are disclosed.

(b) Description of the Related Art

A chemiresistive sensor is a sensor that indicates a change in electrical resistance in response to a change in the type and/or concentration of a chemical substance, and may be used to detect gas components such as toxic or harmful gases.

SUMMARY OF THE INVENTION

An embodiment provides a chemiresistive sensor module capable of real-time realizing high gas sensing performance at room temperature.

Another embodiment provides a wireless electronic device including the chemiresistive sensor module.

Yet another embodiment provides an IoT system including the chemiresistive sensor module.

According to an embodiment, a chemiresistive sensor module includes a chemiresistive sensor including a composite material of a three-dimensional metal-organic framework and a two-dimensional metal-organic framework, a measuring unit for measuring a data on change in electrical resistance detected from the chemiresistive sensor, the measuring unit being electrically connected to the chemiresistive sensor, and a communication unit for transmitting the data on change in electrical resistance to an external device.

The chemiresistive sensor may include a sensor substrate, a pair of electrodes, and an active layer electrically connected to the pair of electrodes and comprising the composite material of the three-dimensional metal-organic framework and the two-dimensional metal-organic framework, and the composite material of the three-dimensional metal-organic framework and the two-dimensional metal-organic framework may be conductive porous composite material.

The two-dimensional metal-organic framework may be adhered to a surface of the three-dimensional metal-organic framework.

The composite material of the three-dimensional metal-organic framework and the two-dimensional metal-organic framework may include the three-dimensional metal-organic framework and the two-dimensional metal-organic framework in a weight ratio of about 9:1 to about 1:9.

The two-dimensional metal-organic framework may include a plurality of two-dimensional hexagonal layers stacked with each other, and each of the plurality of two-dimensional hexagonal layers may be derived from a combination of an organic ligand having a hydrogen bonding functional group and a metal cluster.

The organic ligand of the two-dimensional metal-organic framework may include a benzene ring or a fused polycyclic aromatic ring substituted with one or more hydrogen bonding functional groups selected from a hydroxy group, an amino group, a thiol group, or a combination thereof, and the metal cluster of the two-dimensional metal-organic framework may include $Cu^{2+}$, $Co^{2+}$, $Ni^{2+}$, or a combination thereof.

The three-dimensional metal-organic framework may be a non-conductive porous metal-organic framework having a three-dimensional structure formed by self-assembly of an organic ligand and a metal cluster.

The organic ligand of the three-dimensional metal-organic framework may include an aromatic compound having at least one carboxylic group, and the metal cluster of the three-dimensional metal-organic framework may include $Co^{2+}$, $Ni^{2+}$, $Mn^{2+}$, $Zn^{2+}$, $Mg^{2+}$, $Zr^{2+}$, $Zr^{2+}$, or a combination thereof.

The chemiresistive sensor may be configured to detect hydrogen sulfide, carbon monoxide, or a combination thereof at room temperature.

The chemiresistive sensor may be included in plural to form a chemiresistive sensor array, and the chemiresistive sensor array may include a first chemiresistive sensor and a second chemiresistive sensor configured to detect the same or different gas components.

The two-dimensional metal-organic framework of the second chemiresistive sensor may be different from the two-dimensional metal-organic framework of the first chemiresistive sensor, or the three-dimensional metal-organic framework of the second chemiresistive sensor may be different from the three-dimensional metal-organic framework of the first chemiresistive sensor.

One of the first chemiresistive sensor and the second chemiresistive sensor may be configured to detect hydrogen sulfide at room temperature, and the other of the first chemiresistive sensor and the second chemiresistive sensor may be configured to detect carbon monoxide at room temperature.

The measuring unit may be configured to measure the data on change in electrical resistance detected from the chemiresistive sensor in real time.

The communication unit may be configured to transmit the data on change in electrical resistance to the external device through short-range wireless communication.

The chemiresistive sensor module may further include a battery for supplying power to the chemiresistive sensor module.

According to another embodiment, a wireless electronic device including the chemiresistive sensor module is provided.

According to another embodiment, an IoT system including the chemiresistive sensor module is provided.

High gas sensing performance at room temperature may be realized in real time.

DETAILED DESCRIPTION OF THE EMBODIMENTS

Figure 1:
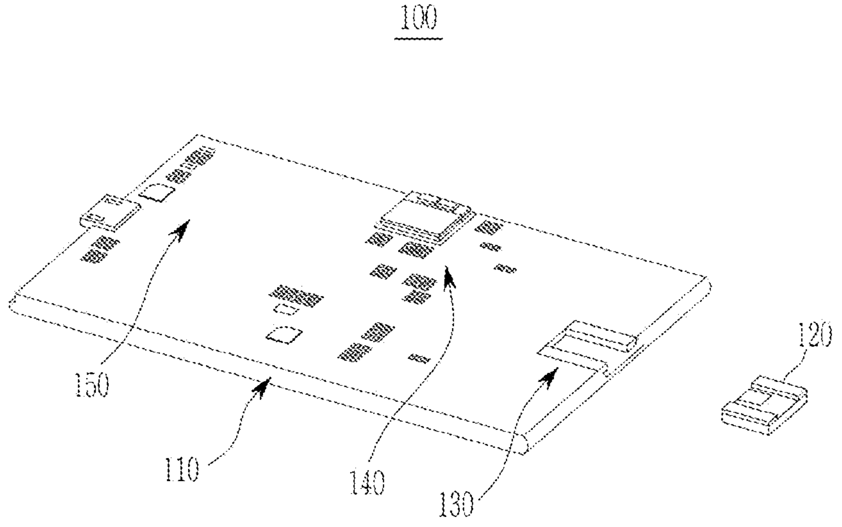
FIG. 1 is a schematic view of a chemiresistive sensor and a chemiresistive sensor module according to an embodiment.

Hereinafter, embodiments of the present disclosure will be described in detail so that a person skilled in the art would understand the same. This disclosure may, however, be embodied in many different forms and is not construed as limited to the example embodiments set forth herein. In the drawings, the thickness of layers, films, panels, regions, etc., are exaggerated for clarity.

Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, the term "combination" includes a mixture and a stacked structure of two or more.

Hereinafter, the term "metal" includes metal and semi-metal.

As used herein, when specific definition is not otherwise provided, "substituted" refers to replacement of a hydrogen of a compound by a substituent of a halogen atom, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a silyl group, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroaryl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, or a combination thereof.

Hereinafter, a chemiresistive sensor module according to an embodiment is described referring to the drawings.

Figure 2:
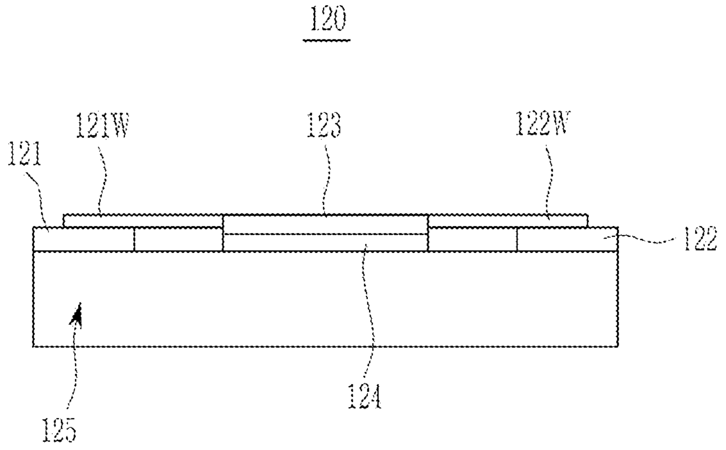
FIG. 2 is a cross-sectional view of the chemiresistive sensor shown in FIG. 1.

FIG. 1 is a schematic view of a chemiresistive sensor and a chemiresistive sensor module according to an embodiment, and FIG. 2 is a cross-sectional view of the chemiresistive sensor shown in FIG. 1.

Referring to FIG. 1, a chemiresistive sensor module 100 according to an embodiment includes a substrate 110; a chemiresistive sensor 120 on the substrate 110; a measuring unit 130 electrically connected to the chemiresistive sensor 120; and a communication unit 140.

The substrate 110 may be, for example, a printed circuit board (PCB), and the chemiresistive sensor 120, the measuring unit 130, and the communication unit 140 may be mounted thereon.

The chemiresistive sensor 120 is a sensor configured to indicate a change in electrical resistance in response to a change in the surrounding chemical environment, and includes a chemiresistor that is a material configured to change its electrical resistance according to chemical interactions with surrounding chemical substances, as an active material.

Referring to FIG. 2, the chemiresistive sensor 120 includes a sensor substrate 125; a pair of electrodes 121 and 122; an active layer 123 electrically connected to the pair of electrodes 121 and 122, respectively, and including a chemiresistor; and connecting wires 121 W and 122 W electrically connecting the active layer 123 to the pair of electrodes 121 and 122, respectively.

The sensor substrate 125 is a supporting substrate to support the chemiresistive sensor 120, and may be made of an inorganic material such as glass; an organic material such as polycarbonate, poly(methyl)methacrylate, polyethylene terephthalate, polyethylene naphthalate, polyimide, polyamide, polyamideimide, polyethersulfone, or combinations thereof; a metal; or a silicon, but is not limited thereto.

The sensor substrate 125 may be omitted, for example, the connecting wires 121 W and 122 W of the chemiresistive sensor 120 may be electrically connected to the measuring unit 130 of the chemiresistive sensor module 100, without the sensor substrate 125.

The pair of electrodes 121 and 122 may face each other in a horizon direction through the active layer 123 and may be electrically connected to a sensor chip electrode (not shown) of the sensor chip 124. However, not limited thereto, the pair of electrodes 121 and 122 may face each other in a vertical direction through the active layer 123.

The pair of electrodes 121 and 122 may include a conductor, for example, a metal such as Al, Ag, Au, Ni, or an alloy thereof; a conductive metal oxide such as zinc oxide, indium oxide, tin oxide, indium tin oxide ITO, indium zinc oxide IZO or fluorine doped tin oxide; nanostructures such as silver nanostructures and carbon nanostructures; or a combination thereof, but is not limited thereto.

The active layer 123 includes a chemiresistor. The chemiresistor is a material configured to show a change in electrical resistance in response to a change in the surrounding chemical environment, and may show a change in electrical resistance according to a chemical interaction between the chemiresistor and surrounding gas components.

The chemiresistor may include metal-organic frameworks (MOFs) based material formed by self-assembly of organic ligands (or organic linkers) and metal clusters (or metal nodes), and may include a composite material of a plurality of metal-organic frameworks that are structurally and functionally different from each other.

For example, the chemiresistor may be or include a composite material of a three-dimensional metal-organic framework (3D-MOF) and a two-dimensional metal-organic framework (2D-MOF) that are structurally and functionally different from each other, and it may be a conductive porous composite material.

The three-dimensional metal-organic framework may be a non-conductive porous metal-organic framework having a three-dimensional structure formed by self-assembly of organic ligands and metal clusters, wherein the three-dimensional structure may have a polyhedral shape with spaces in X, Y, and Z directions. Due to such a three-dimensional structure, the three-dimensional metal-organic framework may have a high porosity and surface area, and thus it may exhibit high adsorption and capacity for gases such as gas molecules. The three-dimensional metal-organic framework may have, for example, a tetrahedron structure, a cube structure, an octahedron structure, a dodecahedron structure, an icosahedron structure, or a combination thereof, but is not limited thereto.

The organic ligands and metal clusters of the three-dimensional metal-organic framework may be selected in consideration of a pair capable of forming the above-described porous three-dimensional structure, high chemical stability, hydrothermal stability, and gas-accepting capacity.

The organic ligands for the three-dimensional metal-organic framework may be, for example, a non-polymer or a non-conductive monomer. For example, the organic ligands for the three-dimensional metal-organic framework may include an aromatic compound having one or more carboxylic groups, and for example, 2,5-dioxidoterephthalate (DOT), 2-amino-1,4-benzene dicarboxylate (BDC), 2,5-dioxodo-1,4-benzenedicarboxylate (DOBDC), 1,3,5-benzenetricarboxylate (BTC), or a combination thereof, but are not limited thereto.

The metal cluster for the three-dimensional metal-organic framework may include $Co^{2+}$, $Ni^{2+}$, $Mn^{2+}$, $Zn^{2+}$, $Mg^{2+}$, $Cr^{2+}$, $Zr^{2+}$, or a combination thereof, but is not limited thereto.

The three-dimensional metal-organic framework may include for example M-MOF-74 (wherein M is Co, Ni, Mn, Zn, Mg, or combination thereof), MIL-101, MOF-808, UiO-66—$NH_2$, or a combination thereof, but is not limited thereto.

The two-dimensional metal-organic framework may be a conductive metal-organic framework having a two-dimensional structure formed by self-assembly of organic ligands and metal clusters, wherein the two-dimensional structure may be a planar structure extending in an in-plane direction (e.g., XY direction) or a layered structure in which a plurality of planar structures are stacked. For example, the two-dimensional metal-organic framework may have a long rod shape in one direction including a layered structure in which a plurality of two-dimensional hexagonal layers to be described later are stacked, wherein a length direction of the long rod shape may be the same as the stacked direction of the layered structure. The two-dimensional metal-organic framework may provide high conductivity to the chemiresistor by forming high conjugation along the in-plane direction of the layered structure and/or between adjacent layered structures.

The organic ligands for the two-dimensional metal-organic framework may be different from the organic ligands for the three-dimensional metal-organic framework, and the metal clusters for the two-dimensional metal-organic framework may be the same as or different from the metal clusters for the three-dimensional metal-organic framework. The organic ligands and metal clusters for the two-dimensional metal-organic framework may be selected in the light of conductivity and a pair capable of providing high binding energy with target gases (e.g., gas molecules such as hydrogen sulfide, carbon monoxide, or combinations thereof).

The organic ligands for the two-dimensional metal-organic framework may be organic ligands capable of forming a hydrogen bonding, for example, it may include a benzene ring or a fused polycyclic aromatic ring substituted with one or more hydrogen bonding functional groups selected from a hydroxyl group (—OH), an amino group (—$NH_2$), a thiol group (SH), or a combination thereof. The fused polycyclic aromatic ring may include two to ten of hydrocarbon aromatic rings, heteroaromatic rings, or a combination thereof, fused with each other.

The organic ligands capable of forming hydrogen bonding may be represented by, for example, any one of Chemical Formulae 1 to 4, but are not limited thereto.

[Chemical Formula 1]

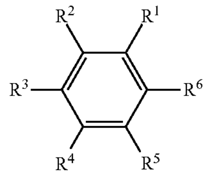

[Chemical Formula 2]

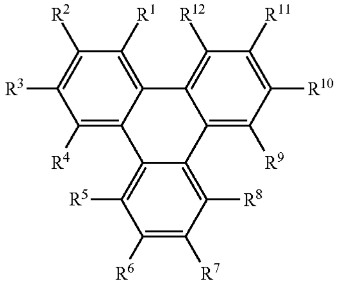

[Chemical Formula 3]

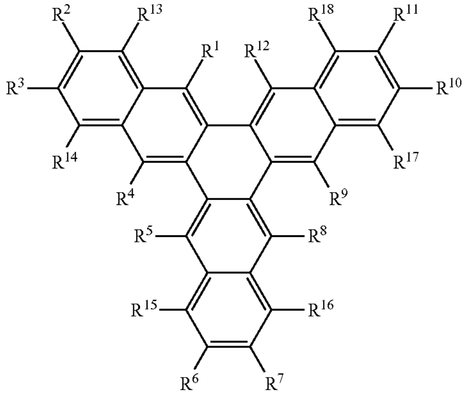

[Chemical Formula 4]

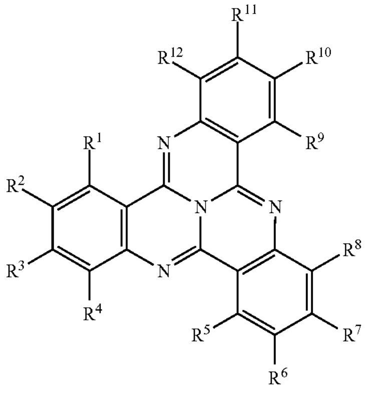

In Chemical Formula 1 to 4, $R^1$ to $R^{18}$ are each independently hydrogen, a substituted or unsubstituted C1 to C30 alkyl group, a substituted or unsubstituted C1 to C30 alkoxy group, a substituted or unsubstituted C6 to C20 aryl group, a substituted or unsubstituted C3 to C20 heterocyclic group, a halogen, a cyano group, or combination thereof, and at least one of $R^1$ to $R^{18}$ are a hydrogen bonding functional group, for example, a hydroxyl group (—OH), an amino group (—$NH_2$), a thiol group (SH), or a combination thereof.

As an example, the organic ligands may have six hydrogen bonding functional groups, thereby forming a two-dimensional hexagonal layer described later. For example, $R^1$ to $R^6$ in Chemical Formula 1 may each be a hydrogen bonding functional group, and for example, each of $R^2$, $R^3$, $R^6$, $R^7$, $R^{10}$, and R" in Chemical Formulae 2 to 4 may be a hydrogen bonding functional group. Six hydrogen bonding functional groups may be reactive sites capable of coordinating with the metal clusters.

For example, the organic ligands may include hexahydroxybenzene, hexaaminebenzene, hexathiolbenzene, hexahydroxytriphenylene, hexaaminetriphenylene, hexathiol triphenylene, hexahydroxytrinaphthylene, hexaaminetrinaphthylene, hexathioltrinaphthylene, or a combination thereof, for example, triphenylene-2,3,6,7,10,11-hexaamine, triphenylene-2,3,6,7,10,11-hexol, triphenylene-2,3,6, 7,10,11-hexathiol, Trinaphthylene-3,4,9,10,15,16-hexaamine, trinaphthylene-3,4,9,10,15, 16-hexol, trinaphthylene-3,4,9,10,15,16-hexathiol, or a combination thereof, but are not limited thereto.

The metal clusters of the two-dimensional metal-organic framework may include, for example, $Cu^{2+}$, $Co^{2+}$, $Ni^{2+}$, or a combination thereof, but is not limited thereto.

The two-dimensional metal-organic framework may include a plurality of two-dimensional hexagonal layers derived from self-assembly of the organic ligands and the metal clusters. Each two-dimensional hexagonal layer may have a honeycomb shape with a plurality of hexagonal pores, and complexes of the organic ligands and the metal clusters continuously arranged may be around the hexagonal pores. The continuous arrangement of the complexes of the organic ligands and the metal clusters may provide high conductivity to the chemiresistor.

A plurality of two-dimensional hexagonal layers may be stacked with each other and include a first two-dimensional hexagonal layer and a second two-dimensional hexagonal layer that are alternately stacked. For example, the metal clusters included in the first two-dimensional hexagonal layer and the metal clusters included in the second two-dimensional hexagonal layer may be arranged side by side (so-called, eclipsed parallel structure) or in a zigzag pattern (so-called slipped-parallel structure) with each other along a direction perpendicular to the in-plane direction of the first and second two-dimensional hexagonal layers. For example, the metal clusters included in the first two-dimensional hexagonal layer and the metal clusters included in the second two-dimensional hexagonal layer may be arranged in a zigzag pattern along a direction perpendicular to the in-plane direction of the first and second two-dimensional hexagonal layers, and thus due to high binding energy, interaction with gases (e.g., gas molecules such as hydrogen sulfide, carbon monoxide, or a combination thereof) may be increased, thereby increasing the binding ability with the gases.

The composite material of the three-dimensional metal-organic frameworks and the two-dimensional metal-organic frameworks may be a mixture of the above-mentioned three-dimensional metal-organic frameworks and the above-mentioned two-dimensional metal-organic frameworks, and the two-dimensional metal-organic frameworks may be effectively adhered to a surface of the three-dimensional metal-organic frameworks by physical adsorption due to electrostatic attraction such as van der Waals interaction therebetween.

The composite material of the three-dimensional metal-organic frameworks and the two-dimensional metal-organic frameworks may include the three-dimensional metal-organic frameworks and the two-dimensional metal-organic frameworks in weight ratio of about 9:1 to about 1:9, within the range, in about 8:2 to about 2:8, about 7:3 to about 3:7, about 6:4 to about 4:6, or about 5:5.

The pair of electrodes 121 and 122 may be formed by, for example, deposition and patterning, and the active layer 123 may be formed by coating a dispersion or a solution containing the composite material of the three-dimensional metal-organic framework and the two-dimensional metal-organic framework and then drying.

The composite material of the three-dimensional metal-organic framework and the two-dimensional metal-organic framework may exhibit high sensitivity for gas molecules such as hydrogen sulfide, carbon monoxide, or combinations thereof at ambient temperature (at room temperature, about 25° C.) as well as high conductivity, compared to the three-dimensional metal-organic framework alone or the two-dimensional metal-organic framework alone, and accordingly, a synergistic effect capable of effectively detecting a target gas component and effectively converting the detected gas into an electrical signal may be exhibited.

The chemiresistive sensor 120 may be detachable from the chemiresistive sensor module 100.

The sensor chip 124 may be electrically connected to the chemiresistive sensor 120 and may include an electrode (not shown) configured to measure a resistance change according to surrounding gas components and/or concentrations. The sensor chip 124 may be electrically connected to the pair of electrodes 121 and 122 on the sensor substrate 125 through the pair of connecting wires 121 W and 122 W.

The sensor chip 124 may be used as a supporting plate on which the active layer 123 is applied, and may include alumina, glass, silicon, silicon oxide-coated silicon, or a combination thereof, but is not limited thereto.

Referring back to FIG. 1, the measuring unit 130 may be configured to measure data on changes in electrical signals of the chemiresistive sensor 120. For example, the measuring unit 130 may be connected to the pair of electrodes 121 and 122 of the chemiresistive sensor 120, and may be configured to measure electrical signals according to a resistance change of the active layer 123 exhibited depending on the type and/or concentration of a gas components such as hydrogen sulfide, carbon monoxide, or a combination thereof.

The measuring unit 130 may include a pair of electrodes (not shown), and each electrode of the measuring unit 130 may be electrically connected to the pair of electrodes 121 and 122 of the chemiresistive sensor 120.

For example, the measuring unit 130 may include a pair of electrodes configured to measure electrical signals according to a resistance change for a single type of gas component of the chemiresistive sensor 120. For example, the measuring unit 130 may include several pairs of electrodes configured to simultaneously measure electrical signals according to resistance changes for a plurality types of gas components of the chemiresistive sensor array 120A to be described layer.

For example, the measuring unit 130 may include four pairs of electrodes configured to simultaneously measure electrical signals according to resistance changes for two, three, or four types of gas components in the 2×2 arrangement of the chemiresistive sensor array 120A The communication unit 140 may be configured to transmit data measured by the measuring unit 130 to an external device through short-range wireless communication such as Bluetooth or near field communication (NFC). For example, the data measured by the measuring unit 130 may be represented by the resistance value over time of the chemiresistive sensor 120, and the data may be continuously transmitted to an external device at intervals of about 0.5 seconds to 10 seconds.

Meanwhile, an application related to gas detection may be installed in the external device such as a mobile phone or a computer, and the external device may receive the data transmitted through the communication unit 140 of the chemiresistive sensor module 100 according to the control of the installed application and display the received data on the screen in the form of real-time numbers, pictures, and/or graphs.

The chemiresistive sensor module 100 may further include a battery 150 for supplying power to the chemiresistive sensor module 100. The battery 150 may be a rechargeable battery or a non-rechargeable battery or a self-powered battery that operates with natural light such as sunlight or indoor light, but is not limited thereto.

Figure 3:
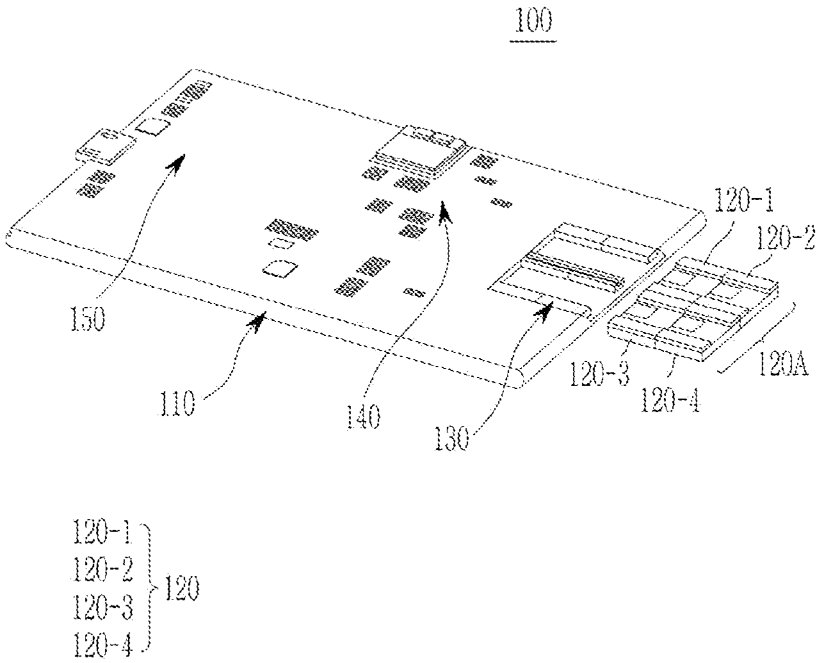
FIG. 3 is a schematic view of a chemiresistive sensor array and a chemiresistive sensor module according to an embodiment.

FIG. 3 is a schematic view of a chemiresistive sensor array and a chemiresistive sensor module according to an embodiment.

The chemiresistive sensor module 100 according to the present embodiment includes a substrate 110; a chemiresistive sensor 120; a measuring unit 130; a communication unit 140; and optionally a battery 150, like the above-described embodiment.

However, in the chemiresistive sensor module 100 according to the present embodiment, the chemiresistive sensor 120 may be included in plural to form a chemiresistive sensor array 120A, unlike the above-described embodiment. The chemiresistive sensor array 120A may include a plurality of the chemiresistive sensors 120 configured to detect the same or different gas components.

For example, the chemiresistive sensor array 120A may include a first chemiresistive sensor 120-1, a second chemiresistive sensor 120-2, a third chemiresistive sensor 120-3, and a fourth chemiresistive sensor 120-4 configured to detect the same or different gas components.

For example, the first chemiresistive sensor 120-1, the second chemiresistive sensor 120-2, the third chemiresistive sensor 120-3, and the fourth chemiresistive sensor 120-4 may be configured to detect the same gas component, for example hydrogen sulfide gas or carbon monoxide. For example, the three-dimensional metal-oxide frameworks and the two-dimensional metal-oxide frameworks respectively included in the first chemiresistive sensor 120-1, the second chemiresistive sensor 120-2, the third chemiresistive sensor 120-3, and the fourth chemiresistive sensor 120-4 may be the same as or different from each other.

For example, some of the first chemiresistive sensor 120-1, the second chemiresistive sensor 120-2, the third chemiresistive sensor 120-3, and the fourth chemiresistive sensor 120-4 may be configured to detect different gas component from others of the first chemiresistive sensor 120-1, the second chemiresistive sensor 120-2, the third chemiresistive sensor 120-3, and the fourth chemiresistive sensor 120-4.

For example, the three-dimensional metal-oxide frameworks and/or the two-dimensional metal-oxide frameworks included in some of the first chemiresistive sensor 120-1, the second chemiresistive sensor 120-2, the third chemiresistive sensor 120-3, and the fourth chemiresistive sensor 120-4 may be different from the three-dimensional metal-oxide frameworks and/or the two-dimensional metal-oxide frameworks included in others of the first chemiresistive sensor 120-1, the second chemiresistive sensor 120-2, the third chemiresistive sensor 120-3, and the fourth chemiresistive sensor 120-4.

For example, some of the first chemiresistive sensor 120-1, the second chemiresistive sensor 120-2, the third chemiresistive sensor 120-3, and the fourth chemiresistive sensor 120-4 may be configured to detect hydrogen sulfide gas and others of the first chemiresistive sensor 120-1, the second chemiresistive sensor 120-2, the third chemiresistive sensor 120-3, and the fourth chemiresistive sensor 120-4 may be configured to detect carbon monoxide.

The chemiresistive sensor module 100 may exhibit high sensitivity to gas components such as hydrogen sulfide, carbon monoxide, or a combination thereof at room temperature (about 25° C.) as well as high conductivity, thereby effectively detecting a target chemical substance (a target gas component) and effectively converting the detected target chemical substance (a target gas component) into electrical signal, and the data on the electrical signal measured in real time may be transmitted to an external device through short-range wireless communication, so that the data may be easily confirmed in real time. The chemiresistive sensor module 100 may be realized in various forms and may measure and monitor chemical substances (gas components) in real time.

For example, the chemiresistive sensor module 100 may be included in or applied to a smart card. The smart card may have a same or similar size and/or shape as a credit card, and various sensors in addition to the above-described chemiresistive sensor 120 may be provided in the smart card to realize a multi-functional sensor module.

For example, the chemiresistive sensor module 100 may be included in or applied to a wireless electronic device. The wireless electronic device may be, for example, an electronic device configured to transmit and receive data through Bluetooth or NFC, and may be, for example, a mobile phone, a tablet, a computer, a laptop, a wireless sensor device, a wireless control device, a wireless air purifier, or a wireless display device, but is not limited thereto.

For example, the chemiresistive sensor module 100 may be applied to an Internet of Things (IoT) system. The IoT system is a technology that attaches a sensor to an object to transmit and receive data over the internet in real time, and a service with a new function may be provided by combining the information of the gas components obtained from the chemiresistive sensor module 100 with a tangible or intangible connected object.

Hereinafter, the embodiments are illustrated in more detail with reference to examples. However, these are only examples, and the scope of claims is not limited thereto.

Synthesis of Three-Dimensional Metal-Organic Frameworks

Synthesis Example 1

0.5 g of 2,5-dihydroxyterephtalic acid (DOBDC) is dissolved in 100 mL of N,N-dimethylformamide (DMF) while stirring, and then a metal salt aqueous solution in which 2.041 g of zinc (II) nitrate hexahydrate is dissolved in 6 mL of deionized water is added thereto. Subsequently, the resultant is transferred to a Teflon-lined vessel and reacted at 100° C. for 24 hours, the obtained product is centrifuged, washed three times with DMF and three times with methanol, and then dried in a vacuum oven at 80° C. overnight to obtain Zn-MOF-74, which is a three-dimensional metal-organic framework.

Synthesis Example 2

0.404 g of 2,5-dihydroxyterephtalic acid (DOBDC) is dissolved in 15 mL of deionized water heated to about 80° C. while stirring, and then a metal salt aqueous solution in which 1.00 g of nickel (II) acetate tetrahydrate is dissolved in 5 mL of deionized water is added thereto. Subsequently, the resultant is reacted for 1 hour while stirring and refluxing, and the obtained product is centrifuged, washed three times with hot deionized water and three times with methanol, and then dried in a vacuum oven at 80° C. overnight to obtain Ni-MOF-74, which is a three-dimensional metal-organic framework.

Synthesis Example 3

0.404 g of 2,5-dihydroxyterephtalic acid (DOBDC) is dissolved in 15 mL of deionized water heated to about 80° C. while stirring, and then a metal salt aqueous solution in which 1.00 g of cobalt (II) acetate tetrahydrate is dissolved in 5 mL of deionized water is added thereto. Subsequently, the resultant is reacted for 1 hour while stirring and refluxing, and the obtained product is centrifuged, washed three times with hot deionized water and three times with methanol, and then dried in a vacuum oven at 80° C. overnight to obtain Co-MOF-74, which is a three-dimensional metal-organic framework.

Synthesis Example 4

0.333 g of 2,5-dihydroxyterephtalic acid (DOBDC) is dissolved in a mixed solvent of 12 mL of DMF, 4 mL of deionized water, and 4 mL of ethanol while stirring, and then a metal salt aqueous solution in which 1.098 g of manganese (II) chloride tetrahydrate is dissolved in 6 mL of deionized water is added thereto. Subsequently, the resultant is transferred to a Teflon-lined vessel and reacted at 135° C. for 24 hours, the obtained product is centrifuged, washed three times with DMF and three times with methanol, and then dried in a vacuum oven at 80° C. overnight to obtain Mn-MOF-74, which is a three-dimensional metal-organic framework.

Synthesis Example 5

0.410 g of 2,5-dihydroxyterephtalic acid (DOBDC) is dissolved in a mixed solvent of 12 mL of DMF, 4 mL of deionized water, and 4 mL of ethanol while stirring, and then a metal salt aqueous solution in which 1.21 g of magnesium (II) acetate tetrahydrate is dissolved in 10 mL of DMF is added thereto. Subsequently, the resultant is transferred to a Teflon-lined vessel and reacted at 125° C. for 6 hours, the obtained product is centrifuged, washed three times with DMF and three times with methanol, and then dried in a vacuum oven at 80° C. overnight to obtain Mg-MOF-74, which is a three-dimensional metal-organic framework.

Synthesis Example 6

290 mg of 2-amino-1,4-benzenedicarboxylic acid (Sigma-Aldrich) is dissolved in 100 mL of N,N-dimethylformamide to prepare a first solution. Separately, 516 mg of zirconium (IV) chloride octahydrate (Sigma-Aldrich) and 27 mL of acetic acid are dissolved in 100 mL of N,N-dimethylformamide to prepare a second solution. Subsequently, after mixing the first solution and the second solution, the mixture is heated at 120° C. for 24 hours, and centrifuged to obtain powders. Then, the powders are washed three times with methanol and three times with acetone, and then dried in vacuum oven at 80° C. for 18 hours to obtain three-dimensional metal-organic frameworks UiO-66—$NH_2$ ($C_{48}H_{34}N_6O_{32}Zr_6$), which is a three-dimensional metal-organic framework.

Synthesis of Two-Dimensional Metal-Organic Frameworks

Synthesis Example 7

210 mg of 2,3,6,7,10,11-hexahydroxytriphenylene hydrate (2,3,6,7,10,11-HHTP hydrate, TCI) is dissolved in a mixed solvent of 60 mL of deionized water and 60 mL of 1-propanal, and 30 mg of nickel (II) acetate tetrahydrate is added thereto to obtain a solution. Subsequently, the solution is irradiated with ultrasonic waves (Bransonic®, CPX388H Ultrasonic Cleaner) at 40 kHz frequency for 10 minutes at room temperature, heated at 55° C. for 3 hours, and centrifuged to obtain powders. The powders are washed three times with deionized water and three times with acetone, and then dried in a vacuum oven at 60° C. for 18 hours to obtain Ni-HHTP ($C_{54}H_{54}O_{36}Ni_6$), which is a two-dimensional metal-organic framework.

Synthesis Example 8

3.5 mg of 2,3,6,7,10,11-hexahydroxytriphenylene hydrate is dissolved in a mixed solvent of 2 mL of 1-propanol and 2 mL of deionized water to prepare a first solution. Separately, 2 mL of 1-propanol and 2 mL of deionized water are put in a 20 mL vial, and 2.4 mg of copper (II) acetate monohydrate is dissolved therein to prepare a second solution, and then the first solution and the second solution are mixed to prepare a mixed solution. Subsequently, the mixed solution is reacted at 55° C. for 3 hours, the obtained product is centrifuged, washed three times with deionized water and three times with acetone, and then dried in a vacuum oven at 60° C. overnight to obtain Cu-HHTP, which is a two-dimensional metal-organic framework.

Synthesis Example 9

3.5 mg of 2,3,6,7,10,11-hexahydroxytriphenylene hydrate is dissolved in a mixed solvent of 2 mL of 1-propanol and 2 mL of deionized water to prepare a first solution. Separately, 2 mL of 1-propanol and 2 mL of deionized water are put in 20 mL of vial and 3 mg of cobalt (II) acetate tetrahydrate is dissolved therein to prepare a second solution, and then the first solution and the second solution are mixed to prepare a mixed solution. Subsequently, the mixed solution is reacted at 55° C. for 3 hours, the obtained product is centrifuged, washed three times with deionized water and three times with acetone, and then dried in a vacuum oven at 60° C. overnight to obtain Co-HHTP, which is a two-dimensional metal-organic framework.

Synthesis Example 10

5 mg of 2,3,6,7,10,11-hexaminetriphenylene hexahydrochloride (2,3,6,7,10,11-HITP hexahydrochloride) is dissolved in a mixed solvent of 2 mL of 2M sodium acetate aqueous solution and 1.5 mL of deionized water to prepare a first solution. Separately, 3.5 mg of copper (II) sulfate pentahydrate is dissolved in 1.5 mL of N,N-dimethylacetamide (DMA) to prepare a second solution, and then the first solution and the second solution are mixed to a mixed solution. Subsequently, the mixed solution is reacted at 65° C. for 3 hours, the obtained product is centrifuged, washed three times with DMA, three times with the deionized water, and three times with acetone, and then dried in a vacuum oven at 60° C. overnight to obtain Cu-HITP, which is a two-dimensional metal-organic framework.

Synthesis Example 11

5 mg of 2,3,6,7,10,11-hexaminetriphenylene hexahydrochloride is dissolved in a mixed solvent of 2 mL of 2M sodium acetate aqueous solution and 1.5 mL of deionized water to prepare a first solution. Separately, 27.11 mg of cobalt (II) nitrate hexahydrate is dissolved in 1.5 mL of DMF to prepare a second solution, and then the first solution and the second solution are mixed to prepare a mixed solution. Subsequently, the mixed solution is reacted at 65° C. for 3 hours, the obtained product is centrifuged, washed three times with DMF, three times with the deionized water, and three times with acetone, and then dried in a vacuum oven at 60° C. overnight to obtain Co-HITP, which is a two-dimensional metal-organic framework.

Preparation Example: Preparing Composite Material

Preparation Example 1

Zn-MOF-74 obtained in Synthesis Example 1 and Cu-HHTP obtained in Synthesis Example 8 are mixed in a weight ratio of 1:1 to prepare a composite material of Zn-MOF-74 and Cu-HHTP.

Preparation Example 2

Ni-MOF-74 obtained in Synthesis Example 2 and Co-HHTP obtained in Synthesis Example 9 are mixed in a weight ratio of 1:1 to prepare a composite material of Ni-MOF-74 and Co-HHTP.

Preparation Example 3

Co-MOF-74 obtained in Synthesis Example 3 and Co-HHTP obtained in Synthesis Example 9 are mixed in a weight ratio of 1:1 to prepare a composite material of Co-MOF-74 and Co-HHTP.

Preparation Example 4

Ni-MOF-74 obtained in Synthesis Example 2 and Cu-HHTP obtained in Synthesis Example 8 are mixed in a weight ratio of 1:1 to prepare a composite material of Ni-MOF-74 and Cu-HHTP.

Preparation Example 5

Co-MOF-74 obtained in Synthesis Example 3 and Cu-HHTP obtained in Synthesis Example 8 are mixed in a weight ratio of 1:1 to prepare a composite material of Co-MOF-74 and Cu-HHTP.

Preparation Example 6

UiO-66—$NH_2$ obtained in Synthesis Example 6 and Ni-HHTP obtained in Synthesis Example 7 are mixed in a weight ratio of 2.8:7.2 to prepare a composite material of UiO-66—$NH_2$ and Ni-HHTP.

Preparation Example 7

Co-MOF-74 obtained in Synthesis Example 3 and Cu-HITP obtained in Synthesis Example 10 are mixed in a weight ratio of 1:1 to prepare a composite material of Co-MOF-74 and Cu-HITP.

Preparation Example 8

Ni-MOF-74 obtained in Synthesis Example 2 and Co-HITP obtained in Synthesis Example 11 are mixed in a weight ratio of 1:1 to prepare a composite material of Ni-MOF-74 and Co-HITP.

Example I: Manufacturing Chemiresistive Sensors

Example 1

The composite material of Zn-MoF-74 and Cu-HHTP according to Preparation Example 1 is dispersed in ethanol in 1 mg/mL to prepare a dispersion for an active layer. An alumina sensor chip on which a pair of Au electrodes are patterned is mounted on a glass substrate (a sensor substrate) on which a pair of sensor electrodes are formed, and each sensor electrode and each Au electrode are electrically connected through connecting wires. Subsequently, the dispersion for an active layer is drop-coated on the alumina sensor chip and dried it to form an active layer, manufacturing a chemiresistive sensor.

Example 2

The chemiresistive sensor is manufactured in the same manner as Example 1, except that the composite material of Ni-MOF-74 and Co-HHTP according to Preparation Example 2 is used instead of the composite material of Zn-MoF-74 and Cu-H HTP according to Preparation Example 1.

Example 3

The chemiresistive sensor is manufactured in the same manner as Example 1, except that the composite material of Co-MOF-74 and Co-HHTP according to Preparation Example 3 is used instead of the composite material of Zn-MoF-74 and Cu-HHTP according to Preparation Example 1.

Example 4

The chemiresistive sensor is manufactured in the same manner as Example 1, except that the composite material of Ni-MOF-74 and Cu-HHTP according to Preparation Example 4 is used instead of the composite material of Zn-MoF-74 and Cu-H HTP according to Preparation Example 1.

Example 5

The chemiresistive sensor is manufactured in the same manner as Example 1, except that the composite material of Co-MOF-74 and Cu-HHTP according to Preparation Example 5 is used instead of the composite material of Zn-MoF-74 and Cu-HHTP according to Preparation Example 1.

Example 6

The chemiresistive sensor is manufactured in the same manner as Example 1, except that the composite material of UiO-66—$NH_2$ and Ni-HHTP according to Preparation Example 6 is used instead of the composite material of Zn-MoF-74 and Cu-HHTP according to Preparation Example 1.

Example 7

The chemiresistive sensor is manufactured in the same manner as Example 1, except that the composite material of Co-MOF-74 and Cu-HITP according to Preparation Example 7 is used instead of the composite material of Zn-MoF-74 and Cu-HHTP according to Preparation Example 1.

Example 8

The chemiresistive sensor is manufactured in the same manner as Example 1, except that the composite material of Ni-MOF-74 and Co-HITP according to Preparation Example 8 is used instead of the composite material of Zn-MoF-74 and Cu-HHTP according to Preparation Example 1.

Reference Example 1-1

The chemiresistive sensor is manufactured in the same manner as Example 1, except that the Zn-MOF-74 obtained in Synthesis Example 1 is used instead of the composite material of Zn-MoF-74 and Cu-HHTP according to Preparation Example 1.

Reference Example 1-2

The chemiresistive sensor is manufactured in the same manner as Example 1, except that the Cu-HHTP obtained in Synthesis Example 8 is used instead of the composite material of Zn-MoF-74 and Cu-HHTP according to Preparation Example 1.

Reference Example 2-1

The chemiresistive sensor is manufactured in the same manner as Example 2, except that the Ni-MOF-74 obtained in Synthesis Example 2 is used instead of the composite material of Ni-MOF-74 and Co-HHTP according to Preparation Example 2.

Reference Example 3-1

The chemiresistive sensor is manufactured in the same manner as Example 3, except that the Co-MOF-74 obtained in Synthesis Example 3 is used instead of the composite material of Co-MOF-74 and Co-HHTP according to Preparation Example 3.

Reference Example 2-2

The chemiresistive sensor is manufactured in the same manner as Example 2 or 3, except that the Co-HHTP obtained in Synthesis Example 9 is used instead of the composite material of Ni-MOF-74 and Co-HHTP according to Preparation Example 2 or the composite material of Co-MOF-74 and Co-HHTP according to Preparation Example 3.

Reference Example 4-1

The chemiresistive sensor is manufactured in the same manner as Example 6, except that the UiO-66—$NH_2$ obtained in Synthesis Example 6 is used instead of the composite material of UiO-66—$NH_2$ and Ni-HHTP according to Preparation Example 6.

Reference Example 4-2

The chemiresistive sensor is manufactured in the same manner as Example 6, except that the Ni-HHTP obtained in Synthesis Example 7 is used instead of the composite material of UiO-66—$NH_2$ and Ni-HHTP according to Preparation Example 6.

Reference Example 5-1

The chemiresistive sensor is manufactured in the same manner as Example 7, except that the Co-MOF-74 obtained in Synthesis Example 3 is used instead of the composite material of Co-MOF-74 and Cu-HITP according to Preparation Example 7.

Reference Example 5-2

The chemiresistive sensor is manufactured in the same manner as Example 7, except that the Cu-HITP obtained in Synthesis Example 10 is used instead of the composite material of Co-MOF-74 and Cu-HITP according to Preparation Example 7.

Reference Example 6-1

The chemiresistive sensor is manufactured in the same manner as

Example 8, except that the Ni-MOF-74 obtained in Synthesis Example 2 is used instead of the composite material of Ni-MOF-74 and Co-HITP according to Preparation Example 8.

Reference Example 6-2

The chemiresistive sensor is manufactured in the same manner as Example 8, except that the Co-HITP obtained in Synthesis Example 11 is used instead of the composite material of Ni-MOF-74 and Co-HITP according to Preparation Example 8.

Evaluation I

The hydrogen sulfide gas ($H_2S$) sensing performance of the chemiresistive sensors according to Examples and Reference Examples are evaluated.

The gas sensing performance is determined from the change in electrical resistance when the chemiresistive sensors according to Examples and Reference Examples are placed at room temperature (about 25° C.) and exposed to hydrogen sulfide gas at a concentration of 5 ppm for 60 minutes. The electrical resistance is measured by DAQ970A model of Keysight.

Figure 4:
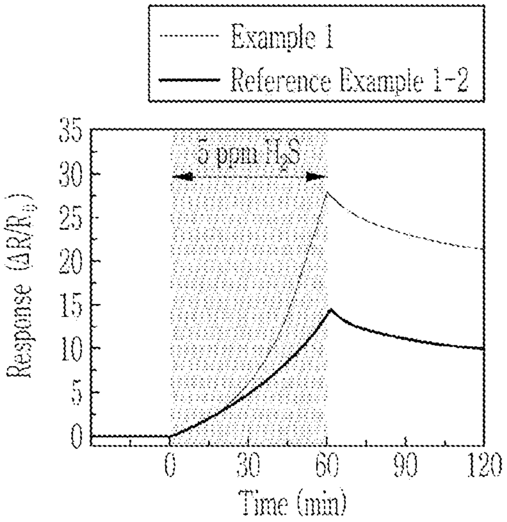
FIG. 4 is a graph showing gas sensitivity when the chemiresistive sensors according to Example 1 and Reference Example 1-2 are exposed to hydrogen sulfide gas.
Figure 5:
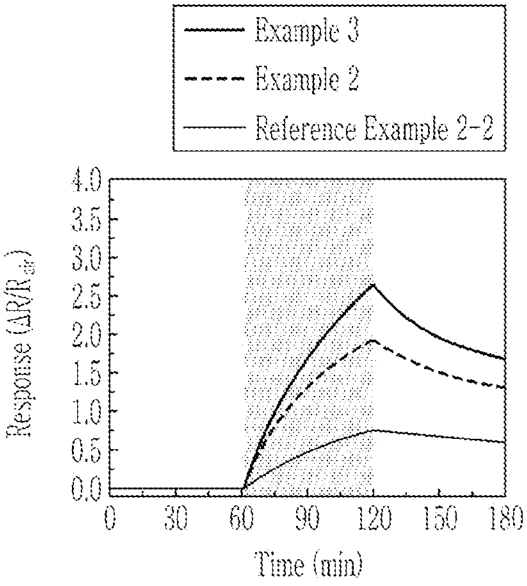
FIG. 5 is a graph showing gas sensitivity when the chemiresistive sensors according to Examples 2 and 3 and Reference Example 2-2 are exposed to hydrogen sulfide gas.
Figure 6:
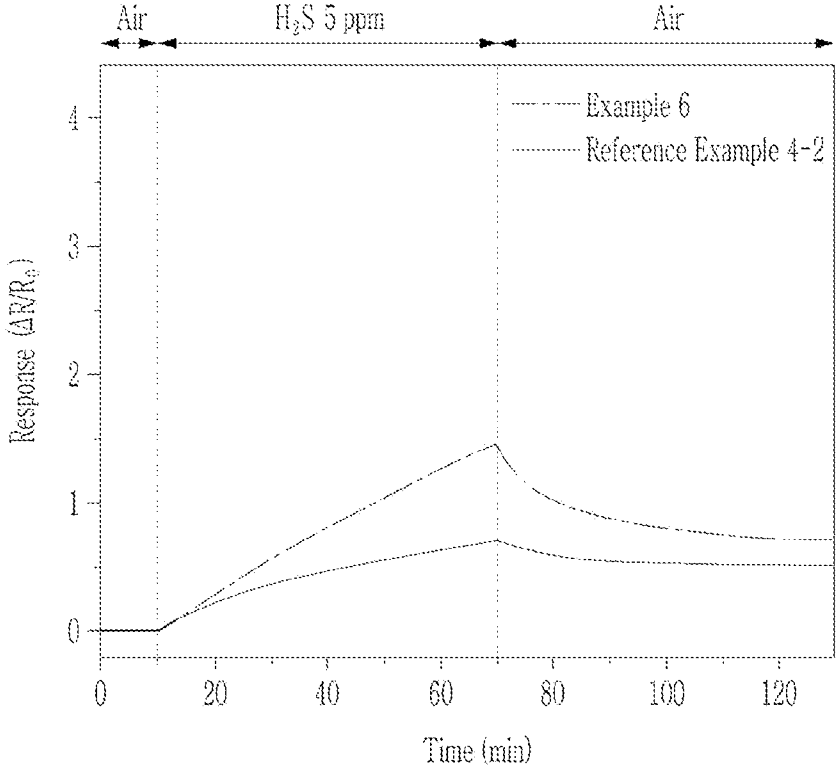
FIG. 6 is a graph showing gas sensitivity when the chemiresistive sensors according to Example 6 and Reference Example 4-2 are exposed to hydrogen sulfide gas.

The results are shown in FIGS. 4 to 6 and Tables 1 to 3.

FIG. 4 is a graph showing gas sensitivity when the chemiresistive sensors according to Example 1 and Reference Example 1-2 are exposed to hydrogen sulfide gas, FIG. 5 is a graph showing gas sensitivity when the chemiresistive sensors according to Examples 2 and 3 and Reference Example 2-2 are exposed to hydrogen sulfide gas, and FIG. 6 is a graph showing gas sensitivity when the chemiresistive sensors according to Example 6 and Reference Example 4-2 are exposed to hydrogen sulfide gas.

TABLE 1

| | $\Delta R/R_0$ |
|---|---|
| Example 1 | 27.76 |
| Reference Example 1-1 | — |
| Reference Example 1-2 | 14.35 |

TABLE 2

| | $\Delta R/R_0$ |
|---|---|
| Example 2 | 1.96 |
| Example 3 | 2.63 |
| Reference Example 2-1 | — |
| Reference Example 3-1 | — |
| Reference Example 2-2 | 0.75 |

TABLE 3

| | $\Delta R/R_0$ |
|---|---|
| Example 6 | 1.45 |
| Reference Example 4-1 | — |
| Reference Example 4-1 | 0.7 |

* R: Electrical resistance when the sensor is exposed to hydrogen sulfide gas $R_0$, $R_{air}$: Electrical resistance when the sensor is exposed to air not including hydrogen sulfide gas

* ΔR: Difference between the electrical resistance when the sensor is exposed to hydrogen sulfide gas and the electrical resistance when the sensor is exposed to air not including hydrogen sulfide gas Referring to FIGS. 4 to 6 and Tables 1 to 3, the chemiresistive sensors according to Examples exhibits high sensitivity for hydrogen sulfide gas compared to the chemiresistive sensors according to Reference Examples.

Accordingly, it is confirmed that the chemiresistive sensors including a composite material of the three-dimensional metal-organic frameworks and the two-dimensional metal-organic frameworks as an active material exhibit a synergistic effect compared to the chemiresistive sensors including three-dimensional metal-organic frameworks alone or two-dimensional metal-organic frameworks alone as an active material.

On the other hand, it is confirmed that the chemiresistive sensors including three-dimensional metal-organic frameworks alone as an active material cannot be measured electrical resistances due to low conductivity, and thus cannot show a change in electrical resistance to hydrogen sulfide gas, as a result, the sensitivity measurement for hydrogen sulfide gas substantially fails.

Evaluation II

The carbon monoxide (CO) gas sensing performance of the chemiresistive sensors according to Examples and Reference Examples are evaluated.

The gas sensing performance is determined from the change in electrical resistance when the chemiresistive sensors according to Examples and Reference Examples are placed at room temperature (about 25° C.) and exposed to carbon monoxide gas at a concentration of 20 ppm for 60 minutes. The electrical resistance is measured by DAQ970A model of Keysight. The results are shown in Tables 4 and 5.

TABLE 4

| | $\Delta R/R_0 \times 100$ (%) |
|---|---|
| Example 7 | 21.9 |
| Reference Example 5-1 | — |
| Reference Example 5-2 | −2.1 |

TABLE 5

| | $\Delta R/R_0 \times 100$ (%) |
|---|---|
| Example 8 | 23.2 |
| Reference Example 6-1 | — |
| Reference Example 6-2 | 3.3 |

Referring to Tables 4 and 5, the chemiresistive sensors according to Examples exhibits high sensitivity ($\Delta R/R_0 \times 100$ (%)) for carbon monoxide gas compared to the chemiresistive sensors according to Reference Examples.

Accordingly, it is confirmed that the chemiresistive sensors including a composite material of the three-dimensional metal-organic frameworks and the two-dimensional metal-organic frameworks as an active material exhibit a synergistic effect compared to the chemiresistive sensors including three-dimensional metal-organic frameworks alone or two-dimensional metal-organic frameworks alone as an active material.

On the other hand, it is confirmed that the chemiresistive sensors including three-dimensional metal-organic frameworks alone as an active material cannot be measured electrical resistances due to low conductivity, and thus cannot show a change in electrical resistance to carbon monoxide gas, as a result, the sensitivity measurement for carbon monoxide gas substantially fails.

Example II: Manufacturing Chemiresistive Sensor Module

Example 9

The chemiresistive sensor according to Reference Example 1-2, the chemiresistive sensor according to Example 1, the chemiresistive sensor according to Example 4, and the chemiresistive sensor according to Example 5 are disposed as first, second, third, and fourth chemiresistive sensors in the chemiresistive sensor array 120A to manufacture the chemiresistive sensor module 100 shown in FIG. 3.

Evaluation III

The data transmitted from the chemiresistive sensor module according to Example 9 is confirmed through an application of a mobile phone.

Figure 7:
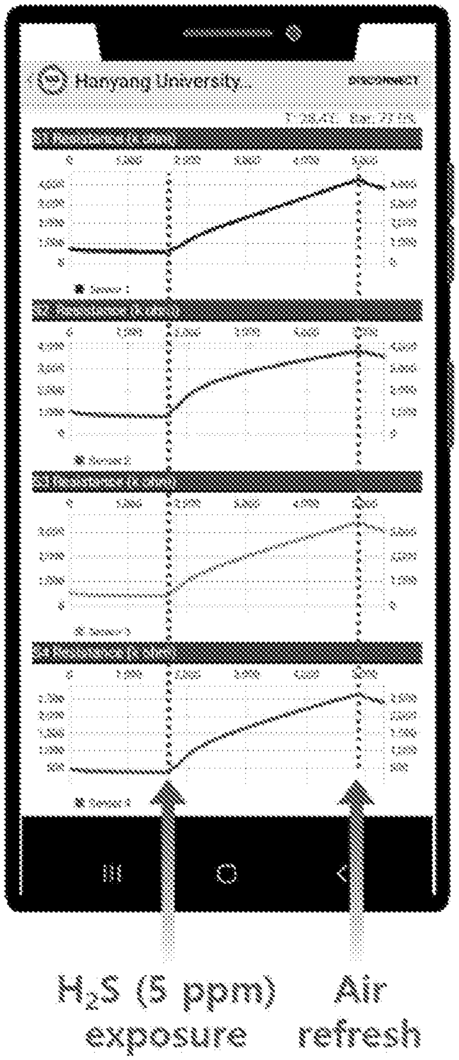
FIG. 7 is a photograph of a screen of a mobile phone showing data transmitted from the chemiresistive sensor module according to Example 9.

FIG. 7 is a photograph of a screen of a mobile phone showing data transmitted from the chemiresistive sensor module according to Example 9.

Referring to FIG. 7, the gas sensing performances are confirmed in real time through an application of a mobile phone for data of each chemiresistive sensor array transmitted from the chemiresistive sensor module according to Example 9.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A chemiresistive sensor module comprising:

a chemiresistive sensor including a composite material of a three-dimensional metal-organic framework and a two-dimensional metal-organic framework, the two-dimensional metal-organic framework being adhered to a surface of the three-dimensional metal-organic framework, a measuring unit for measuring a data on change in electrical resistance detected from the chemiresistive sensor and electrically connected to the chemiresistive sensor, and a communication unit for transmitting the data on change in electrical resistance to an external device, wherein the three-dimensional metal-organic framework is a non-conductive porous metal-organic framework, and the composite material of the three-dimensional metal-organic framework and the two-dimensional metal-organic framework is a conductive porous composite material.

2. The chemiresistive sensor module of claim 1, wherein the chemiresistive sensor comprises:

a sensor substrate, a pair of electrodes, and an active layer electrically connected to the pair of electrodes and comprising the composite material of the three-dimensional metal-organic framework and the two-dimensional metal-organic framework.

3. The chemiresistive sensor module of claim 2, wherein the composite material of the three-dimensional metal-organic framework and the two-dimensional metal-organic framework comprises the three-dimensional metal-organic framework and the two-dimensional metal-organic framework in a weight ratio of about 9:1 to about 1:9.

4. The chemiresistive sensor module of claim 1, wherein the two-dimensional metal-organic framework comprises a plurality of two-dimensional hexagonal layers stacked with each other, and each of the plurality of two-dimensional hexagonal layers is derived from a combination of an organic ligand having a hydrogen bonding functional group and a metal cluster.

5. The chemiresistive sensor module of claim 4, wherein the organic ligand of the two-dimensional metal-organic framework comprises a benzene ring or a fused polycyclic aromatic ring substituted with one or more hydrogen bonding functional groups selected from a hydroxy group, an amino group, a thiol group, or a combination thereof, and the metal cluster of the two-dimensional metal-organic framework comprises $Cu^{2+}$, $Co^{2+}$, $Ni^{2+}$, or a combination thereof.

6. The chemiresistive sensor module of claim 1, wherein the three-dimensional metal-organic framework is formed by self-assembly of an organic ligand and a metal cluster.

7. The chemiresistive sensor module of claim 6, wherein the organic ligand of the three-dimensional metal-organic framework comprises an aromatic compound having at least one carboxylic group, and the metal cluster of the three-dimensional metal-organic framework comprises $Co^{2+}$, $Ni^{2+}$, $Mn^{2+}$, $Zn^{2+}$, $Mg^{2+}$, $Cr^{2+}$, $Zr^{2+}$, or a combination thereof.

8. The chemiresistive sensor module of claim 1, wherein the chemiresistive sensor is configured to detect hydrogen sulfide, carbon monoxide, or a combination thereof at room temperature.

9. The chemiresistive sensor module of claim 1, wherein the chemiresistive sensor is included in plural to form a chemiresistive sensor array, and the chemiresistive sensor array comprises a first chemiresistive sensor and a second chemiresistive sensor configured to detect the same or different gas components.

10. The chemiresistive sensor module of claim 9, wherein the first chemiresistive sensor and the second chemiresistive sensor independently comprise the composite material of the three-dimensional metal-organic framework and the two-dimensional metal-organic framework, and at least one of: the two-dimensional metal-organic framework of the second chemiresistive sensor is different from the two-dimensional metal-organic framework of the first chemiresistive sensor; and the three-dimensional metal-organic framework of the second chemiresistive sensor is different from the three-dimensional metal-organic framework of the first chemiresistive sensor.

11. The chemiresistive sensor module of claim 9, wherein one of the first chemiresistive sensor and the second chemiresistive sensor is configured to detect hydrogen sulfide at room temperature, and the other of the first chemiresistive sensor and the second chemiresistive sensor is configured to detect carbon monoxide at room temperature.

12. The chemiresistive sensor module of claim 1, wherein the measuring unit is configured to measure the data on change in electrical resistance detected from the chemiresistive sensor in real time.

13. The chemiresistive sensor module of claim 1, wherein the communication unit is configured to transmit the data on change in electrical resistance to the external device through short-range wireless communication.

14. The chemiresistive sensor module of claim 1, further comprising a battery for supplying power to the chemiresistive sensor module.

15. A wireless electronic device comprising the chemiresistive sensor module of claim 1.

16. An Internet of Things (IoT) system comprising the chemiresistive sensor module of claim 1.

* * * * *